United States Patent [19]

Cerano et al.

[11] 4,082,486
[45] Apr. 4, 1978

[54] APPARATUS FOR IN-THE-MOLD COATING OF MOLDED ARTICLES

[75] Inventors: Leon R. Cerano, Warren; Mayo M. Reichardt, Milford, both of Mich.

[73] Assignee: General Motors Corporation, Detroit, Mich.

[21] Appl. No.: 746,864

[22] Filed: Dec. 2, 1976

[51] Int. Cl.² ............................................. B29F 1/06
[52] U.S. Cl. .................................. 425/129 R; 425/550; 425/557; 425/561; 425/574; 425/200
[58] Field of Search ............... 425/129 R, 251, 252, 425/242 R, 243, 244, 245, 578, 579, 542, 207, 574, 200, 567, 568, 556, 569

[56] References Cited

U.S. PATENT DOCUMENTS

| 2,890,491 | 6/1959 | Hendry | 425/247 X |
|---|---|---|---|
| 3,192,299 | 6/1965 | Hendry | 425/207 |
| 3,516,123 | 6/1970 | Lang et al. | 425/244 X |
| 3,611,505 | 10/1971 | Weber et al. | 425/244 |
| 3,709,644 | 1/1973 | Farrell | 425/244 X |
| 3,723,037 | 3/1973 | Formo | 425/252 X |
| 3,819,313 | 6/1974 | Josephsen | 425/251 X |
| 3,847,525 | 11/1974 | Bielfeldt et al. | 425/245 R |

FOREIGN PATENT DOCUMENTS

| 1,432,150 | 2/1966 | France | 425/242 |
|---|---|---|---|
| 1,163,529 | 2/1964 | Germany | 425/242 |
| 2,023,801 | 11/1971 | Germany | 425/243 |
| 2,416,694 | 10/1975 | Germany | 425/242 R |

*Primary Examiner*—Francis S. Husar
*Assistant Examiner*—William R. Briggs
*Attorney, Agent, or Firm*—Edward J. Biskup

[57] ABSTRACT

Apparatus for coating one surface of a molded article that consists of a pair of relatively movable die members which when closed form a cavity for molding the article in a desired configuration. One of the die members has a chamber formed therein into which a predetermined amount of liquid coating material is supplied through an injector device which is selectively movable into and out of engagement with an inlet port formed in the die member that communicates with the chamber. After the chamber is charged with the coating material, a plunger forces the material into the cavity to coat the outer surface of the article while the die members are closed.

4 Claims, 5 Drawing Figures

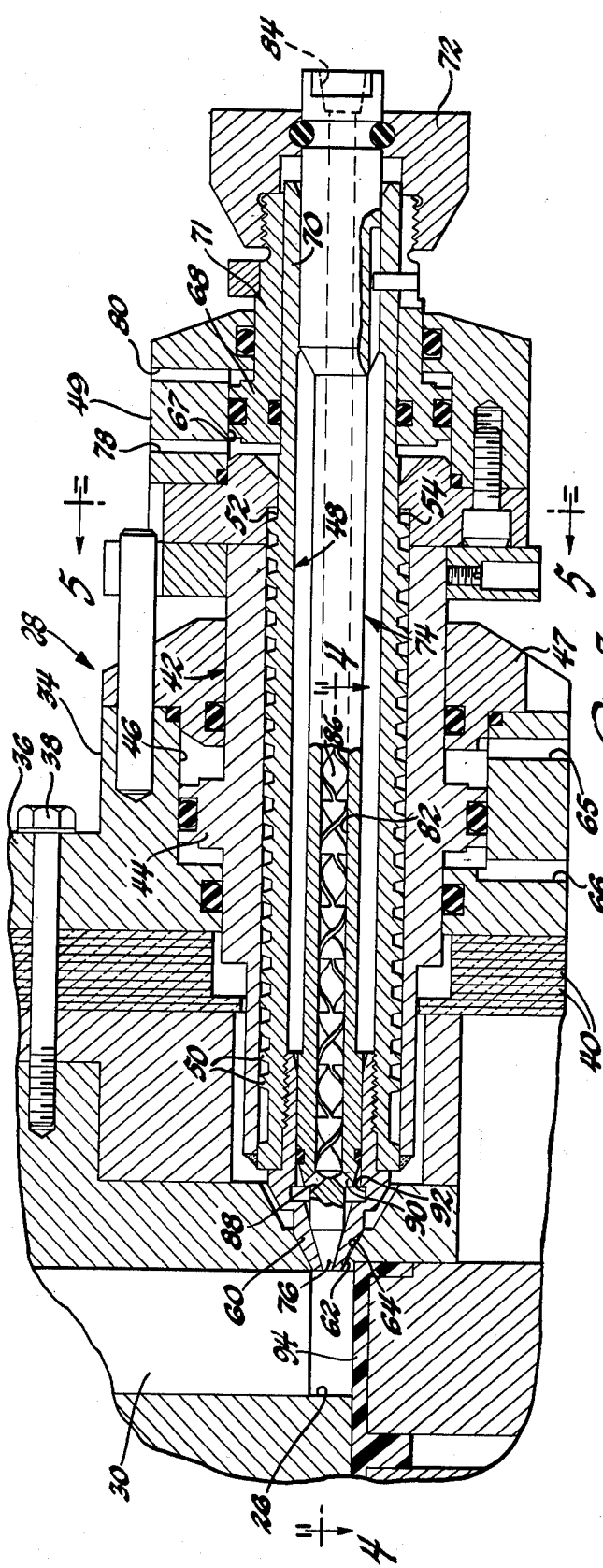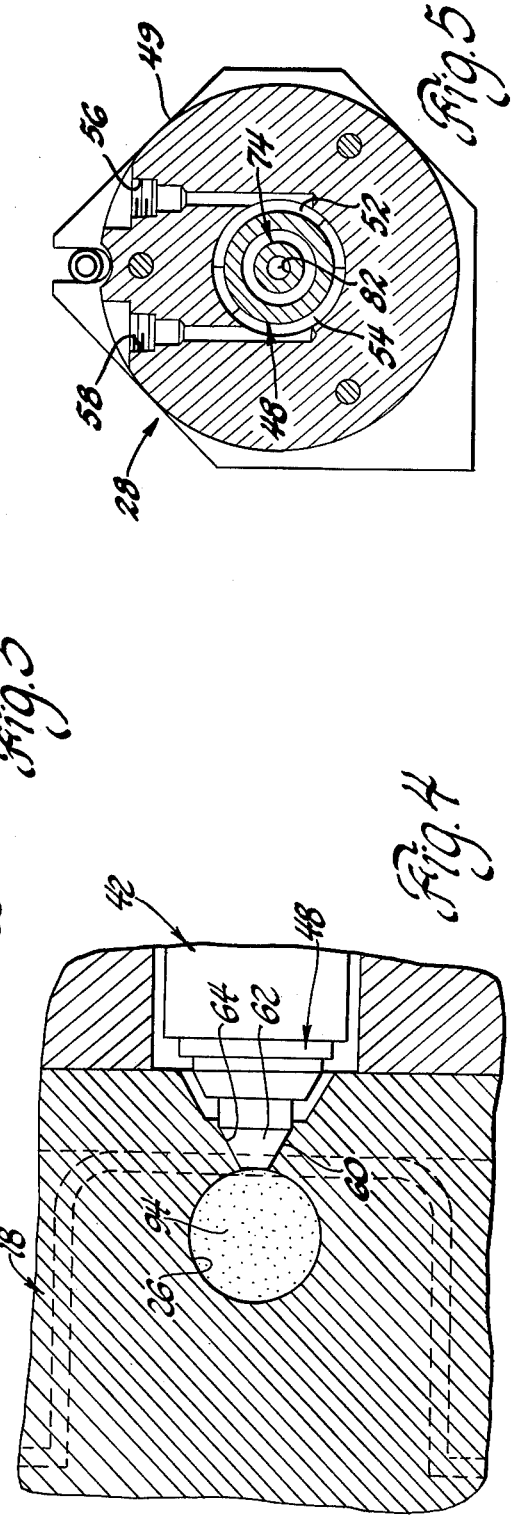

APPARATUS FOR IN-THE-MOLD COATING OF MOLDED ARTICLES

This invention concerns the molding of composite articles and more particularly relates to apparatus for providing a coating onto the outer surface of a compression molded thermoset article during the molding process and without requiring the opening of the die members.

Copending patent application Ser. No. 746,865 filed Dec. 6, 1976, entitled "In-The-Mold Coating of Freshly Molded Articles," in the name of Edwin D. Ditto and assigned to the assignee of this invention discloses a process providing a cosmetic coating or skin to freshly molded articles in cases where the molded surface is aesthetically unacceptable due to molding blemishes caused by porosity, sinks, or cracks which may result from uneven plastic flow or shrinkage during cooling. The process disclosed in the latter mentioned patent application consists of first molding a base portion of the article in the cavity of a pair of relatively movable die members of a die molding set. The base portion of the article is allowed to cure after which a skin forming coating material is injected onto the surface to be improved in such a manner as to hydraulically hold the base portion in place against one of the die members so as to allow separation of the other die member from that surface and provide a partial opening of the mold. The mold is then reclosed and pressure is applied onto the die members so as to distribute the skin forming coating material substantially uniformly across the surface of the base portion and thereby substantially fill the porosity and any shrink portions on the surface.

The apparatus disclosed in this application can be utilized for practicing the process set forth in the patent application referred to above. In this regard, the apparatus according to this invention consists of a pair of relatively movable die members one of which is movable towards the other through a hydraulic ram. When the die members are closed, a cavity is formed therebetween for molding an article in a desired configuration. One of the die members is characterized in that a chamber is formed therein which communicates with the cavity and is adapted to receive a metered amount of liquid coating material in the form of a thermosetting resin which is subsequently used for coating one surface of the molded article. The chamber is provided with a slidable piston or plunger which is movable through an appropriate actuator so as to displace the liquid coating material from the chamber into the cavity and onto one surface of the molded article without requiring the die members to be opened. The coating material is supplied to the chamber by an injector device which has a body portion, one end of which is formed with a nozzle that is located adjacent to the chamber. The nozzle is selectively movable into and out of sealing engagement with an inlet port formed in the associated die member and communicating with the chamber. When the base portion of the article is first being molded in the cavity, the piston in the chamber is flush with the mold cavity and so positioned that both the chamber and the inlet port are closed from communication with the cavity. After the base portion of the article is hardened sufficiently to retain its shape, the piston is moved by the actuator to a second position exposing a predetermined volume of the chamber to the cavity. Simultaneously, the injector device is moved into the inlet port and the liquid coating material is supplied to the chamber with the hydraulic pressure on the ram being relieved. With the nozzle of the injector positioned in the inlet port, the piston is moved by the actuator towards the cavity so as to force the coating material under pressure onto the surface to be coated. The press ram is again actuated to cause the die members to move toward each other and apply pressure to the coating material and the pressure and temperature is maintained for a time sufficient for the coating material to setup sufficiently to allow opening of the die members and ejection of the coated molded article.

The objects of the present invention are to provide a new and improved apparatus for in-the-mold coating of molded articles; to provide a new and improved apparatus for applying a liquid coating material onto one surface of a molded article while the die members are closed; to provide a new and improved apparatus for in-the-mold coating that includes a pair of die members one of which is formed with a precharge chamber for supplying liquid coating material to the mold cavity under pressure and in which the same die member carries a movable injector device for furnishing the coating material to the chamber; to provide a new and improved die set for molding plastic articles wherein one of the die members is provided with a chamber which receives liquid coating material from an injector device which serves to mix two thermosetting resin components and supply the mixture under pressure to the chamber; and to provide a new and improved apparatus for in-the-mold coating of molded articles utilizing two relatively movable die members in which one of the die members carries an ejector device that is selectively movable into and out of sealing contact with the die member for furnishing coating material to a precharge chamber.

Other objects and advantages will be apparent from the following detailed description when taken with the drawings in which:

FIG. 3 is an enlarged sectional view showing in detail the injector device utilized with the invention;

FIG. 4 is a view taken on lines 4—4 of FIG. 3; and

FIG. 5 is a sectional view taken on lines 5—5 of FIG. 3.

Figures 1, 2:
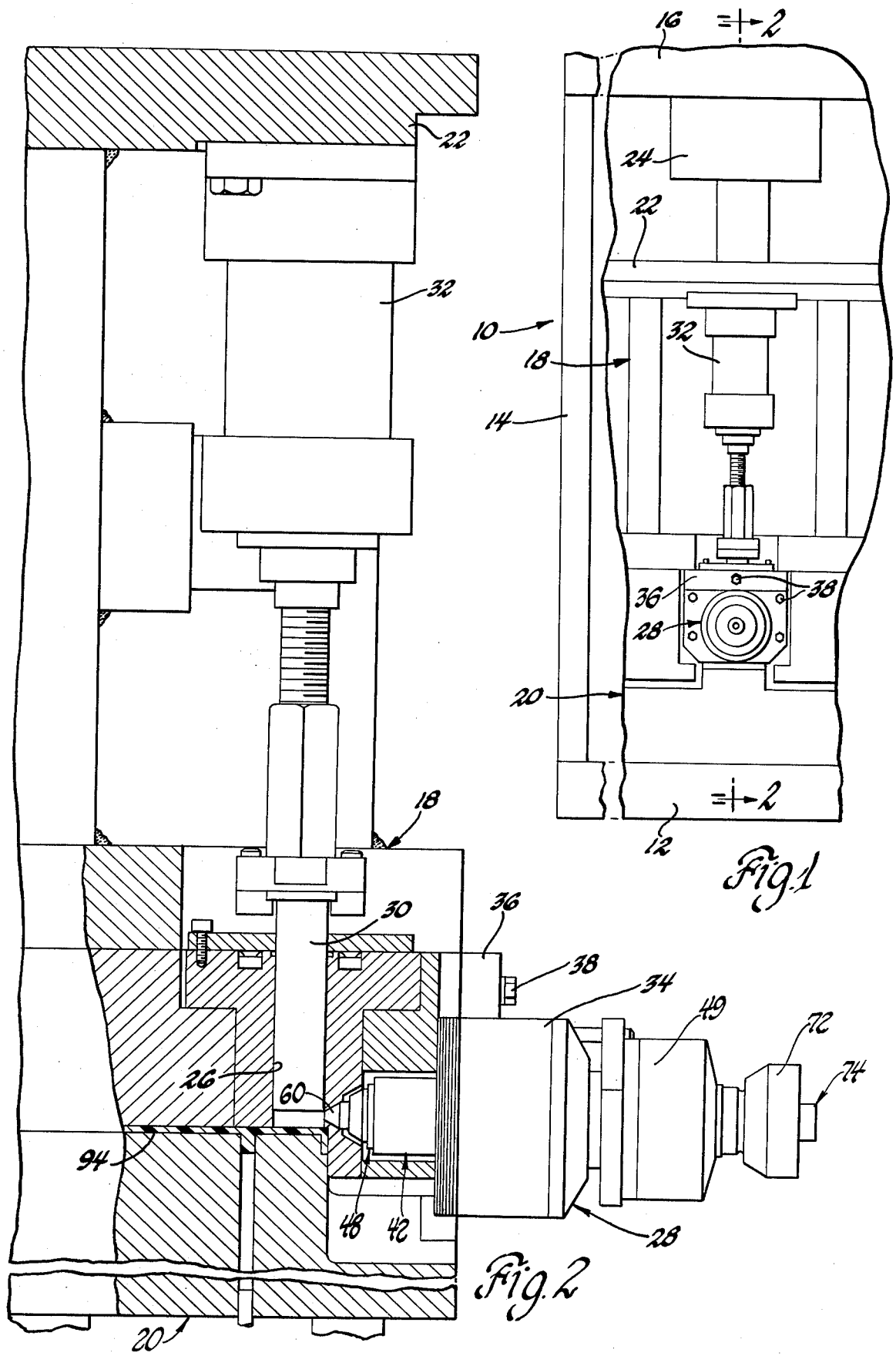
FIG. 1 is an elevation view showing a press incorporating die members made in accordance with the invention.
FIG. 2 is an enlarged side elevation view taken on lines 2—2 of FIG. 1.

Referring to the drawings and more particularly to FIG. 1 thereof, a conventional hydraulic press 10 is partially shown having a base 12 rigidly formed with the usual four upstanding corner post members, only one of which is shown and is identified by reference numeral 14 and is rigidly connected at its upper end to a top support member 16. The press 10 supports a pair of relatively movable die members 18 and 20 the lower one of which identified by reference numeral 20 is rigidly secured to the base 12 while the upper die member 18 is fixedly connected with a plate member 22 which in turn is movable vertically through a double acting hydraulic ram 24 mounted on the support member 16. The hydraulic ram 24 serves to raise the upper die member 18 relative to the lower die member 20 and, although not shown, the upper die member 18 is guided during such movement through appropriate guide members. Thus, by actuating the hydraulic ram 24, the upper die member 18 can assume an open raised position or a lowered closed position as shown in full lines in FIGS.

1 and 2. When the die members 18 and 20 are closed, they form a cavity for molding a plastic article under heat and pressure in a desired configuration. The die members 18 and 20 can not only serve to mold a plastic article as seen in FIG. 2, but in addition, the die member 18 incorporates parts and components to be described hereinafter that provide a coating on one surface of the molded article. The coating is in the form of a liquid skin forming thermosetting resin which is injected against and substantially normal to the surface being coated, so as to achieve maximum immobilization of the substrate.

In order to deliver the liquid thermosetting resin coating material to the surface to be improved, the upper die member 18 has been designed so as to include a precharge chamber 26 and an injector device 28. In this regard, and as seen in FIGS. 2 and 3, the upper die member 18 is formed with a vertically oriented cylindrical precharge chamber 26 which slidably houses a plunger or piston 30, the upper end of which is connected to an actuator in the form of a double acting hydraulic cylinder 32 mounted to the plate member 22. By directing pressurized fluid to one end or the other of the hydraulic cylinder 32, the piston 30 is movable between the full line position shown in FIGS. 2 and 3 and a lowered position wherein the lower horizontal surface of the piston 30 is in the same plane or flush with the surface of the cavity portion in the upper die member 18.

The injector device 28 is carried by the upper die member 18, and as seen in FIG. 2, includes a base cylindrical housing 34 having a flange 36 which serves to securely mount the injector device to the upper die member 18 by a plurality of bolts, each of which is identified by the reference numeral 38. A series of insulator sheets 40 are interposed between the base housing 34 and the upper die member 18 so as to minimize heat transfer between the injector device 28 and the associated die member. The base housing 34 slidably supports a body portion consisting of a pair of rigidly connected concentric sleeve members one of which is a stepped cylindrical outer sleeve member 42 the intermediate portion of which is formed with a radially extending piston member 44 that is movable within a bore 46 formed in the base housing 34 and that is closed by a cap 47 so as to provide pressure chambers on the opposite sides of the piston member 44. The outer sleeve member 42 is secured at its left-hand end as seen in FIG. 3 to an elongated inner sleeve member 48 and, at its right-hand end, the sleeve member 42 is formed with an annular flange which is bolted to an enlarged cylindrical end cap member 49. The outer periphery surface of a portion of the sleeve member 48 is formed with spiraling threads 50 which together with the inner surface of the outer sleeve member 42 form passages for cooling fluid to be directed from the right towards the left around the sleeve member 48 and then return. In other words, the threads 50 begin at a starting point 52 of the inner sleeve member 48 and proceed towards the left-hand end thereof and then return to the point 54 so as to form a single spiraling passage for the cooling fluid. As seen in FIG. 5, a port 56 formed in the end cap member 49 will permit the cooling fluid to enter the passage formed by the threads 50 and to exit through a port 58. In addition, it will be noted that a nozzle 60 is rigidly connected to the inner sleeve member 48 and has a conically shaped outer surface 62 which is adapted to sealingly fit into an inlet port 64 that communicates with the chamber 26.

Accordingly, it should be apparent from the above description that when pressurized fluid is directed via a port 65 in housing 34, to the chamber at the right-hand side of the piston member 44, the nozzle 60 is shifted towards the left into sealing engagement with the inlet port 64. On the other hand, when pressurized fluid is directed via a port 66 in housing 34 to the chamber at the left side of piston member 44, the body portion of the injector device together with the nozzle 60 moves to the right out of engagement with the inlet port 64.

The end cap member 49 has an annular bore 67 formed therein that is closed by the flange formed with the sleeve member 42 so as to form a pressure chamber for supporting a piston member 68 that is slidably carried by an integral cylindrical extension 70 of the inner sleeve member 48. The piston member 68 includes an integral hollow rod portion 71 which is secured to a nut member 72 which in turn is fixed with the outer end of a feeder tube 74 which extends concentrically through the inner sleeve member 48 and terminates with a conically formed head 76 which serves to selectively close the opening in the nozzle 60. Thus, by directing pressurized fluid to one side or the other of the piston member 68, through ports 78 or 80 formed in the end cap member 49, the feeder tube 74 can be shifted axially from the full line position shown towards the right relative to the body portion of the injector device so as to move the head 76 away from the nozzle 60 and expose the opening therein.

It will be noted that the feeder tube 74 is formed with an elongated axially extending cylindrical passage 82 that terminates at one end with a port 84 which is adapted to be connected through a conduit (not shown) to a source of pressure supplied ingredients which make up a two component thermosetting resin system. Also it will be noted that substantially the full length of the passage 82 within the feeder tube is provided with a static mixer 86 which is made by Kenics Corporation and that serves to mix the two liquid components of the thermosetting resin system as they move from the port 84 of the passage 82 toward the inner end thereof. The inner end of the passage 82 adjacent the head 76 connects with two outlet ports 88 and 90 which are angularly outwardly disposed relative to the longitudinal axis of the feeder tube so as to permit the mixed coating material to flow into an annular chamber 92 adjacent the opening in the nozzle 60. Accordingly, it should be apparent that when the feeder tube 74 is moved towards the right as seen in FIG. 2 and as described hereinbefore, the head 76 will move to expose the opening in the nozzle 60 and permit the thermosetting resin coating material to flow into the cylindrical chamber 26 formed in the upper die member 18 when the piston 30 is in the raised position.

The apparatus described above operates as follows: Initially the upper die member 18 is raised relative to the lower die member 20 so as to expose the cavity portion within the lower die member. A slab of sheet molding compound is then placed on top of the lower die member 20 within the cavity. At the same time, port 66 is supplied with pressurized fluid while port 65 is vented to reservoir so that the piston member 44 is moved to the right and causes the nozzle 60 of the injector device 28 to similarly be moved to the right out of engagement with the inlet port 64 formed in the upper die member 18. By retracting the injector device 28 in this manner heat transfer from the heated die member to the injector device is minimized. The hydraulic cylinder 32 is also actuated so as to cause the lower surface of the piston 30 to move downwardly to a flush position with the upper edge of the cavity portion formed in the upper die member 18. With the piston 30 in the lower position, the inlet port 64 is sealed. After the slab of sheet molding compound has been positioned in the open mold, the ram 24 is pressurized driving the upper die member 18 downwardly into telescoping engagement with the fixed lower die member 20 as best shown in FIG. 2. As the upper die member 18 closes on the lower die member 20, the slab of sheet molding compound is deformed under heat and pressure and flows to fill the mold cavity and any rib forming grooves therein so as to form a ribbed substrate such as is seen in FIG. 2 and is identified by the reference numeral 94. The molding pressure generated by the ram is maintained on the upper die member 18 until the substrate 94 cures and hardens sufficiently to permit separation of the upper die member 18 without adversely affecting the substrate. During the cure cycle, sink marks are usually formed above the ribs due to shrinkage occurring. Similarly, the surface of the substrate may also have other imperfections, such as porosity, line cracks, etc. Such defects in the outer surface of the substrate 94 are eliminated by providing a cosmetic coating to the surface to be improved. This coating is applied according to this invention, during the final stages of curing of the substrate.

In applying the coating, the ram pressure initially is relieved on the upper die member 18. Thereafter and during the final stages of curing of the substrate 94, pressurized fluid is directed through port 65 to the right side of the piston member 44 while the other side of the piston member is vented via port 66. As a result, the nozzle 60 moves inwardly or towards the left as seen in FIG. 2, so as to make sealing engagement with the inlet port 64 formed in the upper die member 18. As the nozzle 60 moves to the left into the inlet port 64, an electric circuit, not shown, is energized causing the two thermosetting resin components to be supplied in the proper position under pressure to the port 84 and the passage 82 formed in the feeder tube 74. The hydraulic cylinder 32 is then actuated so that the piston 30 in the precharge chamber 26 is raised to the full line position shown in FIGS. 2 and 3. As the piston 30 is being raised, the left side of piston member 68 is pressurized and the right side is vented causing the feeder tube 74 to move towards the right relative to the nozzle 60 as seen in FIG. 2, so as to expose the opening in the nozzle 60. A metered amount of thoroughly mixed thermosetting resin coating material then flows via the ports 88, 90 and the chamber 92 to fill the chamber 26. Pressurized fluid is then directed to the right side of piston member 68 while the other side is vented so as to cause the feeder tube 74 to move to the left and have the head 76 thereof again seal the opening in the nozzle 60 and also the inlet port 64. A limit switch (not shown) in the aforementioned electric circuit is then activated so as to indicate that the hydraulic cylinder 32 can be actuated for moving the piston 30 downwardly. The piston 30 then moves downwardly causing the liquid coating material in the chamber 26 to be displaced under pressure into the cavity and onto the upper surface of the substrate 94 as seen in FIG. 2. After the piston 30 assumes its original position wherein the lower surface thereof is in line with the upper portion of the cavity or just after the piston 30 moves past the inlet port 64 to seal the latter, the left side of the piston member 44 is once again pressurized via port 66 while the other side is vented via port 65 so as to cause the nozzle 60 to move out of sealing engagement with the inlet port 64 and thereby thermally isolate the injector device 28 from the upper die member 18.

During the time that the piston 30 moves to the lower position so as to cause the coating material to flow into the cavity, the coating material will move laterally outwardly from the locus of injection and over the surface of the substrate 94 hydraulically pressing the latter tightly against the lower die member 20 and thereby preventing its dislodgement or unseating therefrom. It will be noted that at the same time that the coating material is being forced into the cavity by the piston 30, the upper die member 18 opens sufficiently to accommodate all of the injected coating material without completely distributing it across the surface of the substrate. This causes a slight vacuum to be formed in the gap between the substrate 94 and the upper portion of the cavity, which facilitates the spreading of the coating material across the surface of the substrate. It will be noted that the upper die member 18 will rise slightly relative to the lower die member 20 while the piston 30 supplies the coating material to the cavity. This will occur due to the hydraulic pressure exerted against the die members by the coating material being forced under pressure into the cavity and because the appropriate chamber of the ram 24 is vented at such time so as to allow the die member 18 to rise. Mechanical assists on the corners of the movable upper die member 18, of course, can be used to supplement the lifting force created by the coating material as the latter is forced into the cavity. When mechanical assists are used, appropriate controls are employed to synchronize the opening of the die member 18 with the rate of flow of the coating material into the cavity. In other words, the raising of the die member 18 occurs simultaneously with the actuation of the hydraulic cylinder 32 and at a rate only so the in flowing coating material can be accommodated while at the same time maintaining the substrate 94 firmly pressed against the lower die member 20. The opening of the die member 18 and die member parallelism can be controlled by means such as the Force/Velocity control system described by William Todd in his article entitled "Control System Promises Advance Compression Molding Technology," printed in *Modern Plastics,* June, 1976 on pages 54–56. Following the pressurized supply of the coating material onto the upper surface of the substrate 94, the ram 24 is once again activated so as to close the die members 18 and 20 and cause the coating material to be uniformly distributed on the surface to be coated. The pressures and temperatures as well as the type of coating material that can be utilized with the apparatus according to this invention is fully described in the aforementioned patent application Ser. No. 746,865, filed Dec. 6, 1976. Accordingly, attention is directed to the latter application for a full understanding of the process that can be practiced with this invention.

Various changes and modifications can be made in this construction without departing from the spirit of the invention. Such changes and modifications are contemplated by the inventors and they do not wish to be limited except by the scope of the appended claims.

We claim:

1. Apparatus for molding an article and subsequently coating one surface of such molded article, said apparatus comprising a pair of relatively movable die members which when closed form a cavity wherein an article is molded in a desired configuration, means operatively associated with said die members for moving said die members towards and away from each other into open and closed positions respectively, a chamber formed in one of said die members that communicates with said cavity and is adapted to receive a metered amount of liquid coating material, a plunger reciprocably mounted in said chamber, in inlet port formed in said one of said die members that connects with said chamber, means carried by said one of said die members and connected to the plunger for moving said plunger between a first position wherein said inlet port and said chamber communicate with said cavity and a second position wherein the plunger closes said chamber and said port from communication with said cavity, an injector device for supplying said metered amount of liquid coating material to said chamber, said injector device being carried by said one of said die members and having a body portion provided with connected concentric outer and inner sleeve members, the inner and outer sleeve members each having inner and outer ends, the inner end of the inner sleeve member being formed with a nozzle that is movable into said inlet port so as to permit said injector device to supply said metered amount of liquid coating material to said chamber when said plunger is in said first position, a feeder tube located in said inner sleeve member for said liquid coating material and having one end thereof formed with a head positioned adjacent said nozzle and the other end extending beyond the outer end of said outer sleeve member, a passage formed in said feeder tube that opens at one end adjacent said head, a static mixer located in said passage adapted to mix said liquid coating material as it flows through said passage towards said head, means connected to said outer sleeve member for retracting said nozzle from said inlet port when said plunger is in said second position, an end cap member secured to said outer end of said outer sleeve member and having an annular bore formed therein, a piston member connected to said other end of said feeder tube and located in said annular bore, and a pair of ports in said end cap member adapted to direct pressurized fluid to one side or the other of said piston member so as to selectively cause said head to open and close the nozzle so when the nozzle is open and located in said inlet port in said one of said die members the liquid coating material will flow through said feeder tube into said chamber after which said plunger moves from said first position to said second position and the liquid coating material in said chamber is supplied under pressure to said cavity onto said one surface of the molded article with said die members closed.

2. Apparatus for molding an article and subsequently coating one surface of such molded article, said apparatus comprising a pair of heatable and relatively movable die members which when closed form a cavity wherein an article is molded in a desired configuration, means operatively associated with said die members for moving said die members towards and away from each other into open and closed positions respectively, a chamber formed in one of said die members that communicates with said cavity and is adapted to receive a metered amount of liquid coating material, a plunger reciprocably mounted in said chamber, an inlet port formed in said one of said die members that connects with said chamber, means carried by said one of said die members and connected to the plunger for moving said plunger between a first position wherein said inlet port and said chamber communicate with said cavity and a second position wherein the plunger closes said chamber and said inlet port from communication with said cavity, an injector device for supplying said metered amount of liquid coating material to said chamber, said injector device being carried by said one of said die members and having a cylindrical body portion provided with connected concentric outer and inner sleeve members, the inner and outer sleeve members each having inner and outer ends, the inner end of the inner sleeve member being formed with a nozzle that is selectively movable into said inlet port, a feeder tube for said liquid coating material located in said inner sleeve member and having a head movable relative thereto so as to permit said nozzle to be opened to supply said metered amount of liquid coating material to said chamber when the nozzle is located in the inlet port and said plunger is in said first position, said feeder tube having a passage formed therein substantially the full length thereof that opens at one end adjacent said head, a static mixer located in said passage adapted to mix said liquid coating material as it flows through said passage towards said head, said inner and outer sleeve members having passages formed therebetween for receiving cooling fluid to cool said ejector device, fluid operated means connected to said outer sleeve member for retracting said nozzle from said inlet port when said plunger is in said second position so as to prevent heat transfer between the injector device and the associated die member, an end cap member secured to said outer end of said outer sleeve member and having an annular bore formed therein, a piston member connected to the feeder tube and located in said annular bore, and a pair of ports in said end cap member adapted to direct pressurized fluid to one side or the other of said piston member so as to selectively cause said head to open and close the nozzle so when the nozzle is open and located in said inlet port in said one of said die members the liquid coating material will flow through said feeder tube into said chamber after which said plunger moves from said first position to said second position and the liquid coating material in said chamber is supplied under pressure to said cavity onto said one surface of the molded article with said die members closed.

3. Apparatus for molding an article and subsequently coating one surface of such molded article, said apparatus comprising a pair of relatively movable upper and lower die members which when closed form a cavity wherein an article is molded in a desired configuration, means operatively associated with said die members for moving said upper die member towards and away from the lower die member into open and closed positions respectively, a chamber formed in said upper die member that communicates with said cavity and is adapted to receive a metered amount of liquid coating material, a plunger reciprocably mounted in said chamber, an inlet port formed in said upper die member that connects with said chamber, a hydraulic actuator carried by said upper die member and connected to the plunger for moving said plunger between a first position wherein said inlet port and said chamber communicate with said cavity and a second position wherein the plunger closes said chamber and said inlet port from communication with said cavity and assumes a flush position with a portion of said cavity, an injector device for supplying said metered amount of liquid coating material to said chamber, said injector device including a housing carried by said upper die member, insulation means interposed between the housing and the upper die member so as to prevent heat transfer therebetween, said housing having an annular bore formed therein and supporting a body portion provided with connected concentric outer and inner sleeve members, the inner and outer sleeve member each having inner and outer ends, the inner end of the inner sleeve member being formed with a nozzle that is movable into said inlet port so as to permit said injector device to supply said metered amount of liquid coating material to said chamber when said plunger is in said first position, a piston member formed with said outer sleeve member and located in said bore and adapted to have pressurized fluid directed to one side thereof for causing said nozzle out of sealing engagement with said inlet port when said plunger is in said second position, a feeder tube extending through the inner sleeve member and having a head for selectively opening and closing said nozzle and adapted to supply said liquid coating material to said nozzle, said feeder tube having a passage formed therein substantially the full length thereof that opens at one end adjacent said head, a static mixer located in said passage adapted to mix said liquid coating material as it flows through said passage towards said head, an end cap member secured to said outer end of said outer sleeve member and having an annular bore formed therein, a piston member connected to the feeder tube and located in said annular bore formed in said end cap member, and a pair of ports formed in said end cap member adapted to direct pressurized fluid to one side or the other of said piston member connected to said feeder tube so as to selectively cause said head to open and close the nozzle so when the nozzle is open and located in engagement with the inlet port in said one of said die members the liquid coating material is adapted to flow through said feeder tube into said chamber after which said plunger moves from said first position to said second position and the liquid coating material in said chamber is supplied under pressure to said cavity onto said one surface of the molded article with the die members closed.

4. Apparatus for molding an article and subsequently coating one surface of such molded article, said apparatus comprising a pair of relatively movable die members which when closed form a cavity wherein an article is molded in a desired configuration, means operatively associated with said die members for moving said die members towards and away from each other into open and closed positions respectively, a chamber formed in one of said die members that communicates with said cavity and is adapted to receive a metered amount of liquid coating material, a plunger reciprocably mounted in said chamber, an inlet port formed in said one of said die members that connects with said chamber, a hydraulic actuator carried by said one of said die members and connected to the plunger for moving said plunger between a first position wherein said inlet port and said chamber communicate with said cavity and a second position wherein the plunger closes said chamber and said inlet port from communication with said cavity and assumes a flush position with a portion of said cavity, an injector device for supplying said metered amount of liquid coating material to said chamber, said injector device including a housing carried by said one of said die members, said housing having an annular bore formed therein and slidingly supporting a body portion consisting of a pair of rigidly connected concentric inner and outer sleeve members, the outer sleeve member having inner and outer ends and being formed with a piston member located in said bore, the inner sleeve member having inner and outer ends and having the inner end thereof formed with a nozzle that is selectively movable into sealing engagement with said inlet port so as to permit said injector device to supply said metered amount of liquid coating material to said chamber when said plunger in said first position, a pair of ports formed in said housing adapted to direct pressurized fluid to one side or the other of said piston member so as to selectively cause said nozzle to move into and out of sealing engagement with said inlet port, said sleeve members having a spiraling passage formed therebetween along the length of said outer sleeve member for allowing cooling fluid to flow along said body portion from one end to the other, said spiraling passage beginning and ending at said outer end of said outer sleeve member, an end cap member secured to said outer end of said outer sleeve member and having an annular bore formed therein, a feeder tube concentrically extending through the inner sleeve member and terminating at one end thereof with a conically shaped head for selectively opening and closing said nozzle and adapted to supply said liquid coating material to said nozzle, said feeder tube having a passage formed therein substantially the full length thereof that opens at one end adjacent said head, a static mixer located in said passage adapted to mix said liquid coating material as it flows through said passage towards said head, an inlet port and an outlet port formed in said end cap member adapted to direct cooling fluid to and from said spiraling passage, a piston member rigidly connected to said feeder tube adjacent the other end of said feeder tube and located in said annular bore formed in said end cap member, a pair of ports formed in said end cap member adapted to direct pressurized fluid to one side or the other of said piston member connected to said feeder tube so as to selectively cause said conically shaped head to open and close the nozzle so when said nozzle is open and located in sealing engagement with the inlet port in said one of said die members the liquid coating material is adapted to flow through said feeder tube into said chamber after which said plunger moves from said first position to said second position and the liquid coating material in said chamber is supplied under pressure to said cavity onto said one surface of the molded article with the die members closed.

* * * * *